United States Patent [19]
Petrocelli et al.

[11] 3,935,381
[45] Jan. 27, 1976

[54] ELECTRONIC SOLID STATE SENSOR IMAGE SIZE CONTROL

[75] Inventors: Edward A. Petrocelli, Sunrise, Fla.; Anthony C. H. Louie, San Diego, Calif.

[73] Assignee: The United States of America as represented by the Secretary of the Navy, Washington, D.C.

[22] Filed: June 24, 1974

[21] Appl. No.: 482,393

[52] U.S. Cl. ................................................ 178/7.1
[51] Int. Cl.² .......................................... H04N 5/30
[58] Field of Search ............ 178/7.1, 7.3 D, 7.5 SE, 178/DIG. 6; 358/41, 22

[56] References Cited
UNITED STATES PATENTS

| | | | |
|---|---|---|---|
| 3,184,539 | 5/1965 | Thomas | 178/73. D X |
| 3,263,028 | 7/1966 | Shanafelt et al. | 178/7.3 D |
| 3,637,997 | 1/1972 | Peterson | 178/7.5 SE X |
| 3,713,000 | 1/1973 | Driskell et al. | 178/7.5 SE X |

Primary Examiner—Robert L. Griffin
Assistant Examiner—Mitchell Saffian
Attorney, Agent, or Firm—R. S. Sciascia; G. J. Rubens; T. M. Phillips

[57] ABSTRACT

An electronic control system for changing the image size produced by solid state sensors such as the Reticon sensor array, charged coupled devices, etc. The image size is increased or decreased by varying the horizontal and vertical scanning rate with respect to standard TV timing. The scanning rate is controlled by controlling the frequency of the horizontal and vertical clock pulses applied to the solid state sensor.

4 Claims, 3 Drawing Figures

ELECTRONIC SOLID STATE SENSOR IMAGE SIZE CONTROL

BACKGROUND OF THE INVENTION

In a conventional vidicon camera, there are two known methods used to produce an image size change with respect to a television frame display. One is the use of an optical zoom lens. The optical image is focused on the vidicon face plate and the zoom lens changes the optical image size on the face plate. Consequently, the electric image size produced by the vidicon changes accordingly. The second method is by electronically changing the rate of change of the vidicon camera sweep voltage with respect to the rate of change of the sweep of the TV monitor voltage as shown in U.S. Pat. No. 3,497,614.

There are no known electronic means for changing the image size in solid state sensor systems. However, optical zoom lens can be employed to fit the image size change. Generally zoom lens are bulky, large in size, heavy in weight and expensive. They are not adaptable to microminiaturization and cannot be integrated with the solid state sensors. They are susceptible to mechanical vibrations due to their mass and are subject to misalignment of the optical axis because of the number of optical elements within the zoom lens.

SUMMARY OF THE INVENTION

The present invention provides a system which can produce from a class of solid state sensors an electronic image, whose size can be changed with respect to a television monitor display. The class of solid state sensors consist of those that require digital clock pulses to serially or parallelly read out the video signal. This differentiates from the type of sensors that require an analog sweep voltage to read out video signals. Examples of the solid state's sensors include Reticon sensor array, charge-couple devices etc. The present invention provides a means for controlling the readout rate of the sensor by varying the frequency of the horizontal and vertical clock pulses.

OBJECTS OF THE INVENTION

An object of the invention is a provision of a system which performs an electronic zoom of the image for solid state sensors.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
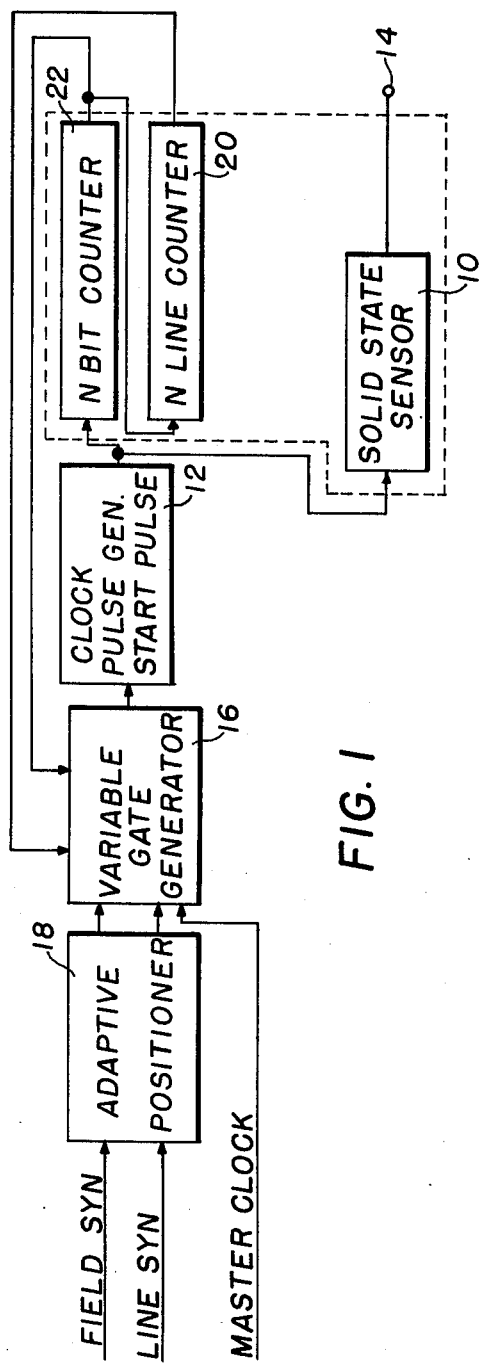
FIG. 1 is a simplified block diagram of a preferred embodiment of the invention.

In general a solid state array sensor requires a two phase clock pulse to serially switch the sensing of each photo diode or serially to transport the charge from one sensing element to the other until all charges are moved out. In a 32 × 32 sensor array, each line requires 32 clock pulses, and there are 32 lines. Total, 1,024 clock pulses are needed to read out all photo diode sensing elements. To have the video thus derived to be displayed in a TV monitor, the video must come in proper step in time synchronized with respect to the line and field synchronized pulses. How far advanced or delayed, with respect to the line and field synchronized pulses, the video begins to enter the monitor determines picture position with the TV frame. Video signals must occur in step with the clock pulses. Therefore control of the picture position within the TV frame is by controlling the clock pulses with respect to line and field synchronized pulses. If each of 32 clock pulses had a small period such as 100 nanoseconds the total 32 clock pulses occupy in time 3.2 microseconds. The resultant video in a line occupies 3.2 microseconds. A TV line of 525 lines system requires 63.5 microseconds. Therefore on a line basis, the video appears in a very small portion in a TV line; approximately 1/21th of the line. Similarly, if the video only covers 26 lines, on the frame basis the video occupies a small portion of the heighth; approximately 1 20th of the 525 lines in the TV frame.

Referring now to FIG. 1 there is shown a solid state sensor 10 which may be a Reticon sensor array, for example, which has horizontal and vertical clock pulses applied from clock pulse generator 12 to read out the video information and provides a video output at output terminal 14. Clock pulses generated in clock pulse generator 12 are controlled by a variable gate generator 16. Variable gate generator 16 controls the number of clock pulses supplied from a master clock (not shown) to clock pulse generator 12. Variable gate generator 16 is controlled by adaptive positioner 18 in a manner hereinafter described below. N line counter 20 and N bit counter 22 provide feedback signals to variable gate generator 16 to stop the clock pulses at the end of the TV frame. In practice N line and N bit counters 20 and 22 are contained on the same chip of the Reticon sensor. However they would be external to a charged coupled device sensor.

Figure 2:
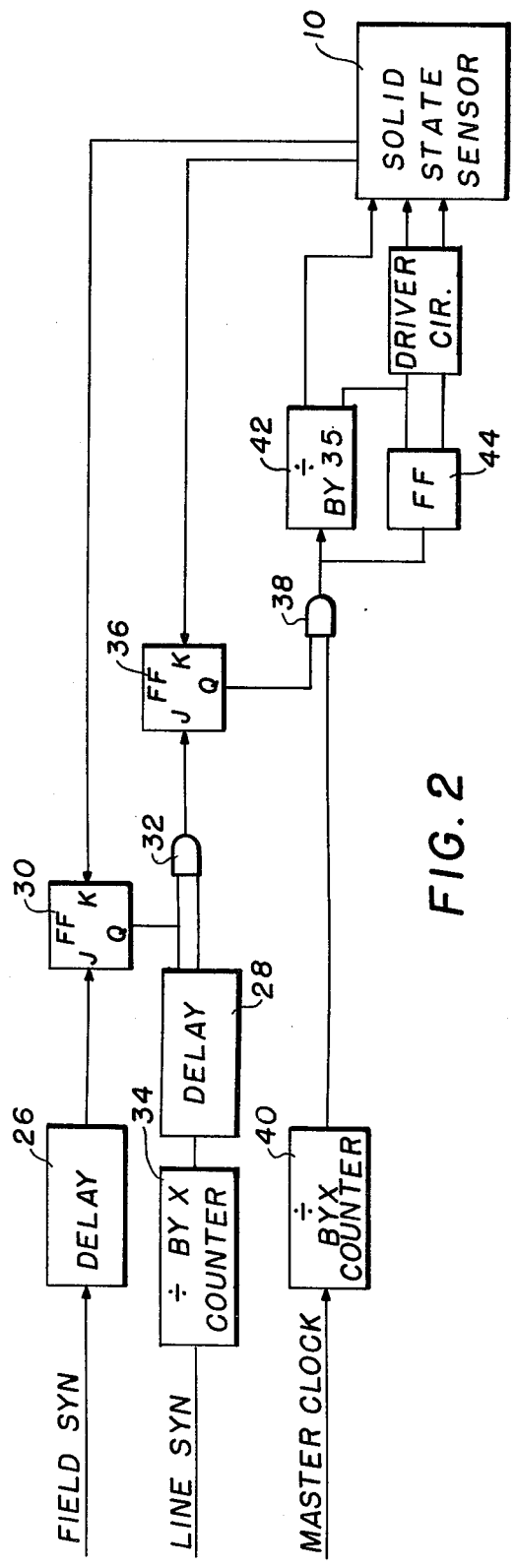
FIG. 2 is a more detailed diagram of the embodiment of FIG. 1.
Figure 3:
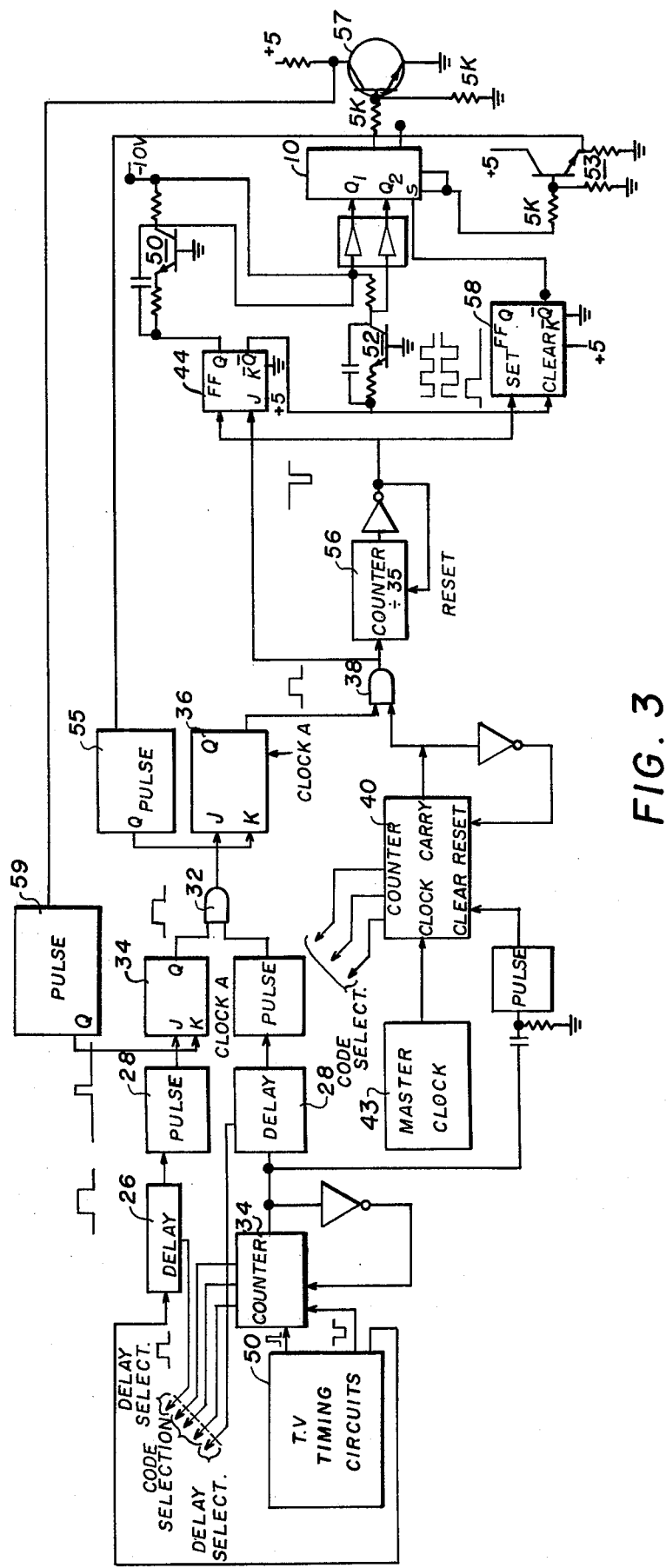
FIG. 3 is a schematic diagram of the embodiment of FIG. 1.

Referring now to FIG. 2, adaptive positioner 18 is shown as delay circuits 26 and 28 in the field sync signal input line and line sync input line respectively. The amount of delay depends upon a programmed RC time constant of a one shot multivibrator in the conventional manner. The output of delay 26 is the start of the vertical gate and triggers a flip-flop circuit 30 to provide a vertical gate signal out that is fed to AND gate circuit 32. Counter 34 selects the line on the raster on which the sensor 10 will be scanned. The output of counter 34 will be in the form of a selected line sync pulse. The selected line sync pulse is delayed by delay circuit 28 and is fed to AND gate circuit 32 which will provide an output pulse which is the enabled line gate triggering signal. The triggering signal is fed to a flip-flop circuit 36 which generates the output line gate that is fed to AND gate 38. The input pulses from the master clock, not shown, is fed to a divide by x counter 40 which is used to generate clock pulses at a frequency which is ½, ⅓, ¼, etc. of the master clock frequency. These clock pulses are fed to AND gate 38 and will pass through as long as the line gate persist at the output of flip-flop 36. The clock pulses from AND gate 38 are fed to a divide by 35 circuit 42 to provide the start pulse for the sensor 10. The output pulses from gate 38 are also fed to another flip-flop circuit 44 for generating a two phase clocks that are required to drive the Reticon sensor 10. Generally a two or three phase clocks will be required to drive a charged coupled device sensor. Referring to the schematic diagram of FIG. 3 where the circuit of FIGS. 1 and 2 is shown in more detail, the line and field sync pulses are provided from the standard TV timing circuits 50. As described above solid state sensor 10 requires two phase clocks to read out the video. These 180° phased clock pulses are provided at terminals Q1 and Q2 of sensor 10 by means of driver circuits 50 and 52. The driver circuit 50 is driven from the Q output of flip-flop circuit 44 while driver circuit 52 is driven from the inverted Q output of flip-flop 44. The waveform pulses of opposite phase are derived by feeding the clock pulses from AND gate 38 to the clock terminal of flip-flop circuit 44 and provides two output pulses of opposite polarity having the frequency of the input clock pulses from gate 38. Flip-flop circuit 44 will be reset on every 35th pulse which is received from the inverted carrier pulse from counter 56. The start pulse for sensor 10 is provided by once every 35th pulse by the same carry pulse from counter 56. The output pulse from counter 56 triggers flip-flop 58 to provide the start pulse at terminal S.

Clock pulses from a master clock 43 are fed to counter 40 which is programmed by means of a code selection input to permit output pulses at the carry terminal every second, third or fourth pulse to appear. The clock pulses from counting circuit 40 are fed to AND gate 38 which is controlled by the line gate pulse from flip-flop 36. The line gate pulse is generated by simultaneously applying a vertical gate and a synchronizing pulse to AND gate 32. The line gate pulse is turned off by the end of line pulse signal fed from the solid state sensor 10 through the emitter follower circuit 53 and pulse forming circuit 55. The vertical gate is formed by feeding the vertical signal from the standard TV timing circuits 50 through delay circuit 26 to pulse forming network 28 which is fed to flip-flop circuit 34. The vertical gate pulse is turned off by the end of line pulse signal fed from sensor 10 through emitter follower 57 and pulse forming network 59.

Obviously many modifications and variations of the present invention are possible in the light of the above teachings. It is therefore to be understood that within the scope of the appended claims the invention may be practiced otherwise than as specifically described.

What is claimed is:

1. An electronic control system for generating scanning clock signals to control the scanning rate of a solid state sensor to read out the video information and control the image size reproduced on a TV monitor comprising:
   a. s source of clock frequencies,
   b. timing circuit means for providing a field synchronizing pulse output and a line synchronizing pulse output;
   c. first counter circuit means coupled to said source of clock frequencies to provide a scanning clock signal of a predetermined frequency determined by a desired picture size,
   d. delay circuit means coupled to said timing circuit means for delaying the field and line synchronizing pulses a predetermined time delay,
   e. variable gate generator circuit means coupled to said delay circuit means and to said first counter means for gating a predetermined number of clock pulses to said solid state sensor corresponding to the size of the sensor array,
   f. feedback circuit means coupled from said sensor to said variable gate generator circuit means for providing a feedback signal to turn off said variable gate at the end of said predetermined time.

2. The control system of claim 1 wherein said delay circuit means includes a first delay circuit coupled to the field sync output of said timing circuit means and a second delay circuit coupled through a divide by $x$ counter to the line sync output of said timing circuit means for providing delayed line and vertical sync pulses to establish the position of the start of the horizontal and vertical scan respectively.

3. The control system of claim 2 wherein said variable gate generator circuit means includes:
   a. a first flip-flop circuit coupled to the output of said first delay circuit for providing a vertical gate signal,
   b. a first AND gate having a first input coupled to the output of said first flip-flop circuit and a second input coupled to the output of said second delay circuit for providing an output gate signal,
   c. a second flip-flop circuit having a first input coupled to the output of said first AND gate for providing an output gate signal,
   d. a second AND gate having a first input coupled to the output of said second flip-flop circuit and a second input coupled to the source of clock pulses for gating said clock pulses as long as a gate signal is generated by said second flip-flop circuit.

4. The control system of claim 3 wherein feedback circuit means are coupled from said sensor to said first and second flip-flop circuit means for providing a feedback signal to turn off said flip-flops at the end of the scan of the frame of said sensor.

* * * * *